United States Patent [19]
Poisson

[11] Patent Number: 5,996,665
[45] Date of Patent: Dec. 7, 1999

[54] APPARATUS FOR TRANSFERRING AND EXTRACTING A BLANK OF STICKY MATERIAL RELATIVE TO A WORKSTATION, AND A TRANSFORMING PRESS CONSTITUTING AN APPLICATION THEREOF

[75] Inventor: Laurent Poisson, Vic le Comte, France

[73] Assignee: Pinette Emidecau Industries, Cedex, France

[21] Appl. No.: 08/960,226

[22] Filed: Oct. 29, 1997

[30] Foreign Application Priority Data

Oct. 29, 1996 [FR] France .................................. 96 13476

[51] Int. Cl.$^6$ ....................................................... B30B 5/06
[52] U.S. Cl. ...................... 156/555; 156/583.5; 100/151; 100/154; 425/371
[58] Field of Search ..................... 156/555, 580, 156/582, 583.1, 583.5; 425/371; 100/151, 154

[56] References Cited

U.S. PATENT DOCUMENTS

| | | | |
|---|---|---|---|
| 4,080,241 | 3/1978 | Grevich et al. ........................ | 156/498 |
| 4,316,709 | 2/1982 | Petersson et al. ................ | 425/174.8 E |
| 4,420,357 | 12/1983 | Neubauer et al. ................... | 156/274.6 |

FOREIGN PATENT DOCUMENTS

| | | |
|---|---|---|
| 0283378 | 9/1988 | European Pat. Off. . |
| 0588361 | 3/1994 | European Pat. Off. . |
| 06171733 | 6/1994 | Japan . |
| 634224 | 3/1950 | United Kingdom . |
| 1254391 | 11/1971 | United Kingdom . |
| 9510468 | 4/1995 | WIPO . |

*Primary Examiner*—James Sells
*Attorney, Agent, or Firm*—Bacon & Thomas PLLC

[57] ABSTRACT

Transferring and extracting sticky blanks. The apparatus including a thin layer disposed under tension stress in contact with the top of the go length and extending in the travel direction of said length downstream beyond the zone in which said length bends and as far as a zone where said layer co-operates with a takeup transporter. The apparatus is applicable to lines for shaping after prior pressing and heating.

38 Claims, 4 Drawing Sheets

APPARATUS FOR TRANSFERRING AND EXTRACTING A BLANK OF STICKY MATERIAL RELATIVE TO A WORKSTATION, AND A TRANSFORMING PRESS CONSTITUTING AN APPLICATION THEREOF

FIELD OF THE INVENTION

The present invention relates to the technical field of handling and transferring blanks made of material that is relatively thin compared with their surface area, and having at least one of their large faces that are of a sticky or adhesive character, either naturally, or else by an optionally reversible transformation, in particular a transformation induced by heat.

The term "transfer" is used to cover transporting or conveying or indeed displacing, as well as inserting or extracting blanks of sticky material relative to a workstation.

More particularly, but not exclusively, the technical field concerned is that of transferring blanks of material based at least in part on thermoplastics, and which are treated by application of heat that makes the blanks sticky on at least one of their large faces.

Preferred applications of the invention include installations for hot shaping blanks based on composite thermoplastic or thermosetting materials for the purpose of obtaining shaped parts, such as those designed and used for constituting coverings or linings for technical purposes or for reasons of appearance, for example motor vehicle door linings, back window shelf panels, and even vehicle dashboards, or panels for providing insulation, particularly sound insulation.

BACKGROUND OF THE INVENTION

In the above preferred applications, the shaped parts that are to be obtained require the use of a shaping mold of the type comprising a punch and a die, serving to shape a blank of material based on thermoplastic composites, which blank is subjected to a preheating stage prior to being engaged in the mold, thereby imparting an appropriate temperature to the material for subsequent shaping of its thickness by means of the mold which is itself cooled for this purpose, which shaping generally includes compacting or compression of the material.

Blanks for constituting individual parts are cut to an appropriate plane shape and are generally selected to be made up of padding materials which may be woven or non-woven, including greater or smaller quantities of fibers or threads of natural or synthetic or thermoplastic material, such as polypropylene or polyethylene. Any base material can thus be appropriate, and in this respect it is general practice to use layers of woven or non-woven or felted material.

It should naturally be understood that in the meaning of the invention, the particular nature of the blanks is part of the prior art that is known and available to any person skilled in the art.

The blanks, which in some cases can be thought of as stiff sheets, are thus heated, generally right through, either by infrared radiation or by applying hot air, or indeed by a so-called "contact" method, it also being possible to combine these various methods.

When heating blanks or sheets by contact, it is appropriate to use a kind of press in which hot plates are brought with controlled relative pressure into contact with the two large faces of each blank or sheet in order to transfer sufficient heat to the component fibers thereof for softening the thermoplastic material.

To be successful, such a method generally requires successive temperature-raising steps to be performed in order to reduce the cycle type required for transformation and thus increase production throughput. That is why such presses generally include two or even more contact heating press assemblies, each assembly implementing respective pressures and temperatures that may be at different levels.

That technique is likewise known to the person skilled in the art.

Nevertheless, in an application of the kind outlined above, a problem that arises is that of inserting and transferring blanks from one heating assembly to another, and to an even greater extent, of extracting the blank from the last heating assembly in order to bring each blank into the mold proper by means of a pickup transporter.

The difficulty arises because of the sticky character imparted to the two large faces of the blank, and also because of its softened state which does not help in providing suitable conditions for such a blank to be picked up successfully, given its adhesive character.

In an attempt to solve this technical difficulty, it has been recommended to make use of extractor clamps that may be situated transversely to the travel direction of the blanks, or parallel to said direction.

Said clamps must initially take hold of the edge or margin of each blank and exert sufficient pressure on the material thereof to cause it to move relative to a moving transporter or a static conveyor, in spite of the sticky or adhesive character of the blank.

Such extractor clamps must therefore act on material that is strong enough and preferably not sticky, which is why such blanks are initially cut to a shape leaving excess margins which are not heated by contact and which are subsequently cut off.

Operating in that way subjects the shaping operation to a severe cost penalty and it is generally the subcontractor who must bear the cost of the additional raw material which is scrapped.

Another drawback of the technique using pickup clamps stems from the fact that they are not adapted to taking hold of blanks whose edges to be grasped are not parallel to the direction in which the clamps are set up. Unfortunately, this situation arises frequently, given that the blanks need to have plane shapes that correspond to the shapes of the parts which are to be obtained, for legitimate reasons of not wasting material. This applies to plane shapes in the form of non-rectangular quadrilaterals.

Account should also be taken of prior art proposals which consist in implementing conveyor belts made of materials that have the reputation of being unaffected by adhesive or sticky materials. In this respect, mention can be made of belts made of glass fibers that are coated or covered in an appropriate material, such as polytetrafluoroethylene.

In practice, those proposals have not been found to be entirely satisfactory since it often happens that when a hot blank is extracted from a press on its way to the mold, there is uncontrolled adhesion of the blank which remains stuck to the conveyor belt, regardless of whether the belt is constituted by a single endless belt or by two endless belts with facing lengths. Under such circumstances, a blank which sticks to one or other of the belts is then brought back to the inlet of the pressing and heating station, which can therefore no longer operate automatically.

The running of the entire installation is then seriously disturbed, giving rise to reduced throughput, and indeed the need to stop operation, e.g. when the uncontrolled and random movement of a blank clogs up an operating subassembly which needs to be put back into its initial state before the machine as a whole can operate properly. It is clear that such situations make it difficult to achieve automatic operation, even though that is preferred for such machines.

Finally, mention should be made of another prior art proposal consisting in taking each blank at the entrance to the pressing and heating station, sandwiching it between two fine pieces of cloth which may be woven or non-woven, and which are provided to oppose adhesion. That solution achieves its result, but it increases production costs in a non-negligible manner.

OBJECTS AND SUMMARY OF THE INVENTION

The object of the invention is to remedy the known drawbacks by proposing a novel transfer apparatus, particularly for extraction purposes, that is capable of solving the above difficulties by allowing relative displacement of blanks of sticky material between successive workstations.

An object of the invention is to fill this gap in the prior art by proposing means that are simple, cheap, and suitable for being implemented on existing machines whether or not they are new, without requiring particularly expensive renovation costs.

Another object of the invention is to propose technical means which are simple, robust, and long-lasting, and which need no more than periodic maintenance and/or cleaning, where necessary.

A further object of the invention is to propose technical means which overcome the general difficulty explained above and which make it possible, optionally, to omit coverings of non-sticky materials, or the spraying of such materials for maintenance purposes, thereby reducing overall operating costs and making it possible to achieve substantial savings in the production of shaped parts.

Another object of the invention is to provide technical means making it possible to manufacture parts that cannot be made with an extraction method based on clamps, and also to avoid the need for a strip of raw material that is provided to be engaged by clamps and that is subsequently scrapped.

To achieve the above objects, the apparatus for transferring and extracting a blank of sticky material relative to a workstation and of the type comprising at least one continuously or intermittently driven endless transporter belt with a go length passing through said workstation, includes a thin layer disposed under tension stress in contact with the top of the go length and extending in the travel direction of said length downstream beyond the zone in which said length bends and as far as a zone where said layer co-operates with a takeup transporter.

The invention also provides a press for transforming blanks or stiff sheets of composite material, including a heating station which is provided with apparatus of the above-specified type.

BRIEF DESCRIPTION OF THE DRAWINGS

Various other characteristics appear from the following description given with reference to the accompanying drawings which show embodiments of the invention as non-limiting examples.

MORE DETAILED DESCRIPTION

Figure 1:
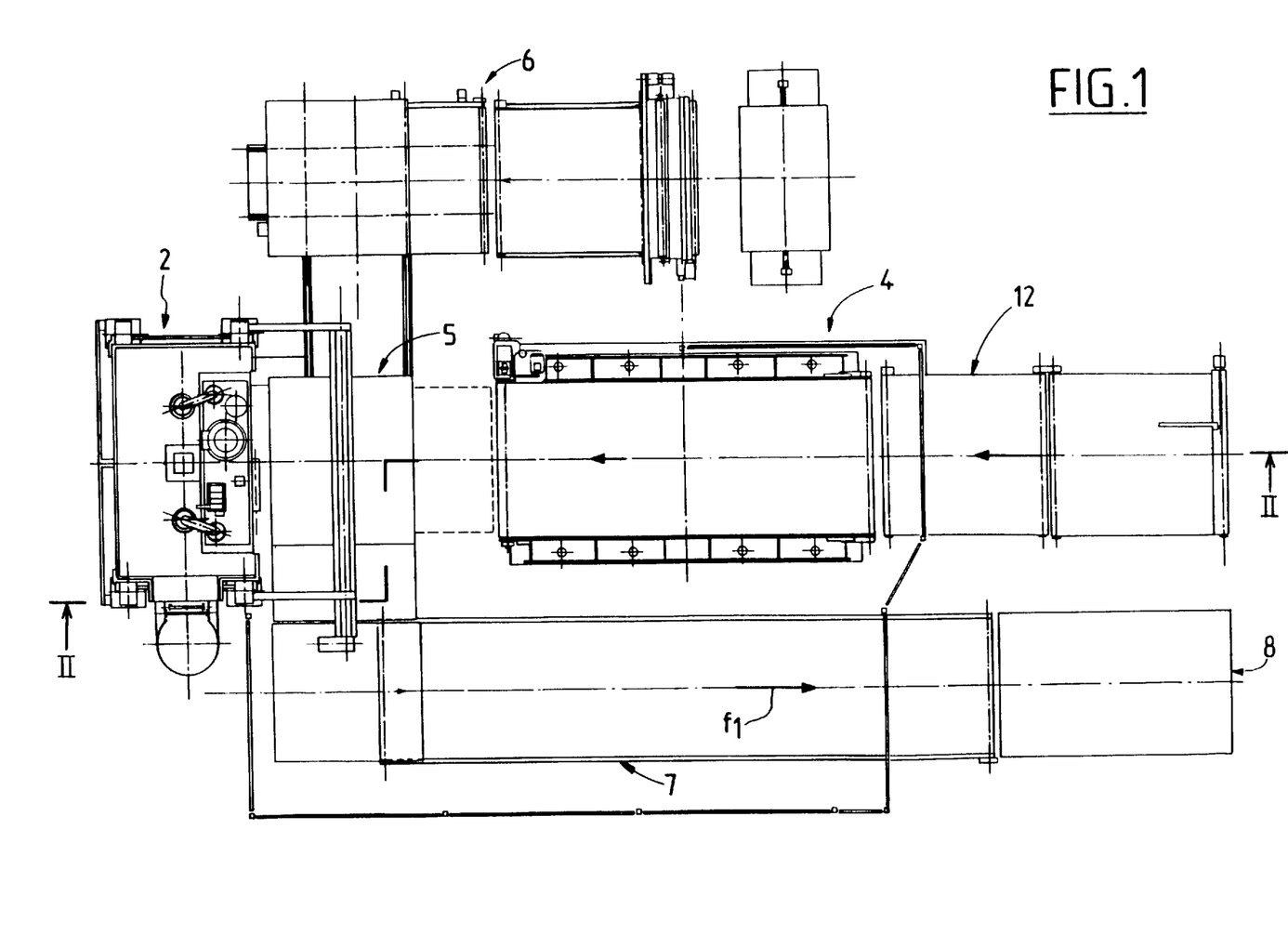
FIG. 1 is a plan view of a complete unit for performing transformation by pressing, and constituting an application of the invention.
Figure 2:
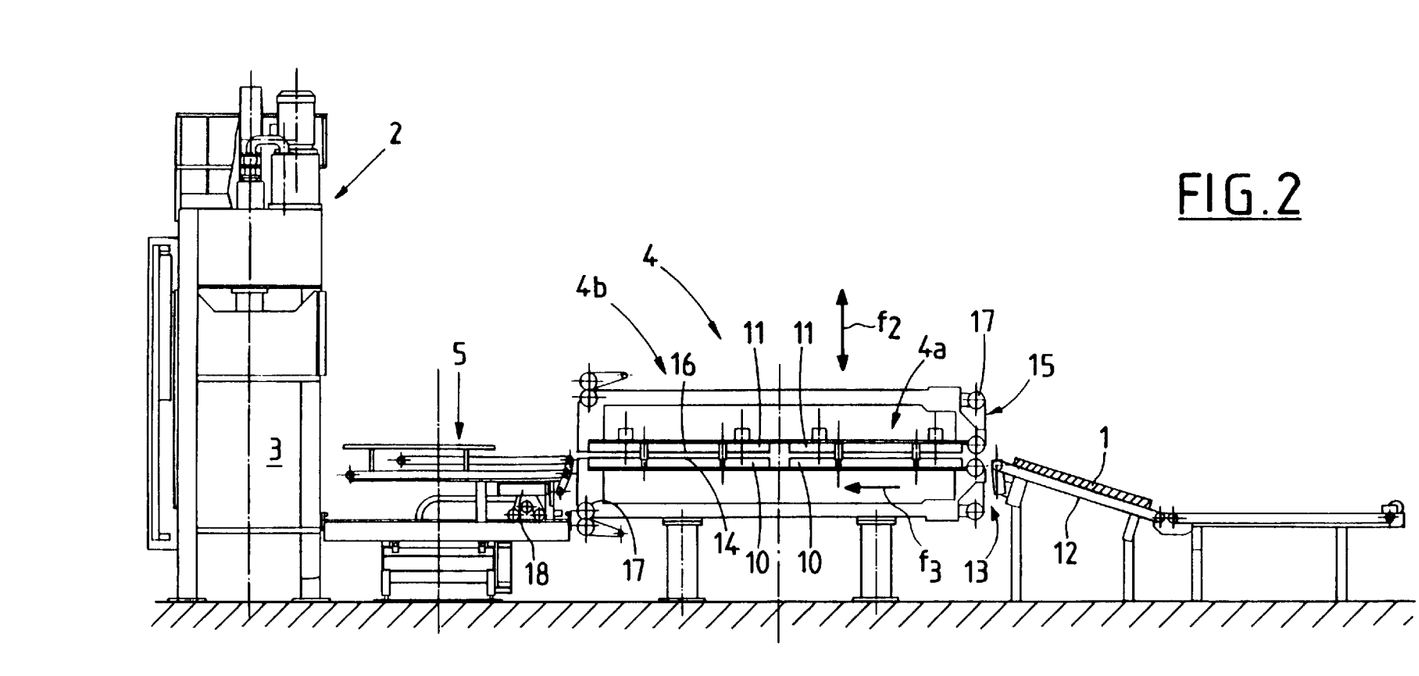
FIG. 2 is a side view substantially on chain-dotted line II—II of FIG. 1.

FIGS. 1 and 2 show the preferred application of the invention to an installation or machine for producing a shaped part from a stiff sheet or blank 1 of thermoplastic composite material such as a felt or a woven or non-woven fabric composition or a layer of padding or the like, which part is shaped by means of a molding press 2. In addition to the necessary accessories, the press includes in conventional manner a mold 3 based on at least two component parts that can be considered as being two complementary parts such as a punch and a die. In the example shown, the molding installation 3 is of the vertical type, meaning that the mold join plane between the die and the punch is generally horizontal.

In order to shape the blank 1, the installation shown comprises a heating station 4, a pickup transporter 5 interposed between the station 4 and the press 2, and parallel to the press, a lateral station 6 whose function is to feed the press 2 with a lining covering, or to feed inserts that are to be associated with the blank 1 prior to final shaping.

FIG. 1 shows that the installation also includes, laterally but on the opposite side to the station 6, a pickup conveyor 7 for taking the shaped products from the press 2 and conveying them in the direction of arrow $f_1$, for example, to a temporary storage station such as 8.

In conventional and known manner, the heating station 4 is of the type having two assemblies 4a and 4b serving to provide contact heating in two stages while simultaneously pressing each blank or stiff sheet 1. To this end, each assembly 4a, 4b comprises a generally stationary bottom hot plate 10 which is heated by any appropriate means, and a moving top plate 11 which is movable over a reciprocating stroke in the direction of arrow $f_2$ by control means such as actuators (not shown). At rest, the plates 10 and 11 are spaced apart by a distance which is sufficient to allow a blank or stiff sheet 1 to be inserted after being taken from a feed table 12 by an endless transporter such as an endless belt, so as to be taken over by at least one belt 13 passing through the heating station 4, and in the present case having its go length 14 passing through the assemblies 4a and 4b in succession.

A belt 15, identical to the belt 13 is preferably associated with the moving top plates 11 such that its go length 16 extends parallel to the go length 14 and faces it so as to co-operate therewith to define a passage along which the stiff sheet or blank 1 progresses.

The transporter belts 13 and 15 are in the form of closed loops passing around rollers 17 which serve in conventional manner to deflect them, to tension them, and to drive them so that their go lengths 14 and 16 travel in the same direction, as indicated by arrow $f_3$. The lengths 14 and 16 are referred to as "go" lengths in contrast to the opposite lengths which are referred to as "return" lengths and which are situated outside the press and heater assemblies 4a and 4b.

It must also be understood that at least the top plates 11 could be constituted in the form of a single element which would then be common to both assemblies 4a and 4b.

Similarly, for reasons of cycle duration, it should be understood that temperature could be raised by passing blanks through three pressing stations, or even more.

The table 12 is situated at the entrance to the pair of belts 13 and 15 which are associated at their outlet with the takeup transporter 5 serving, e.g. via a shuttle table 18, not only to take up each pressed and heated blank from the outlet of the station 4, but also to transfer and deliver said blank for the purpose of being inserted into the mold 3 of the press 2.

Figure 3:
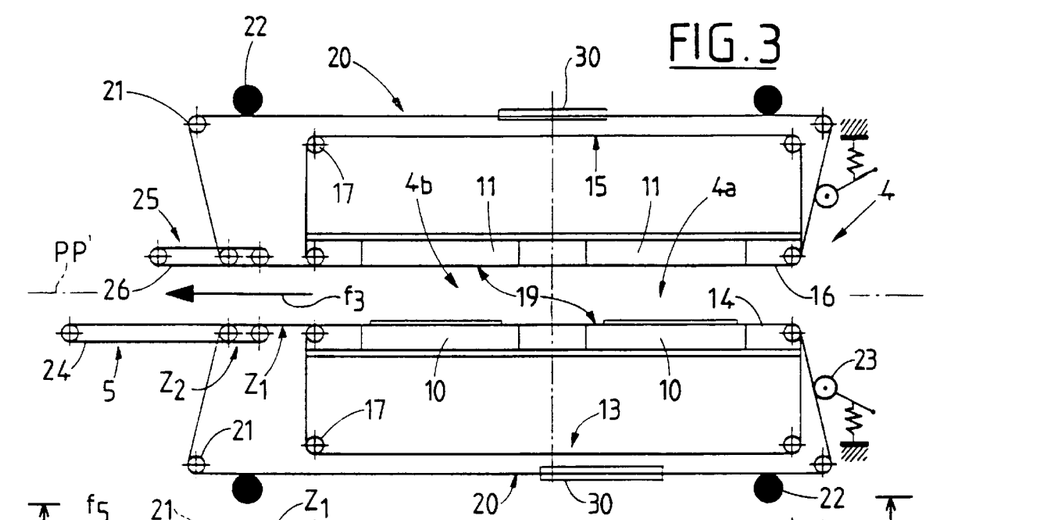
FIG. 3 is a diagrammatic view of the transfer and extractor apparatus of the invention.
Figure 4:
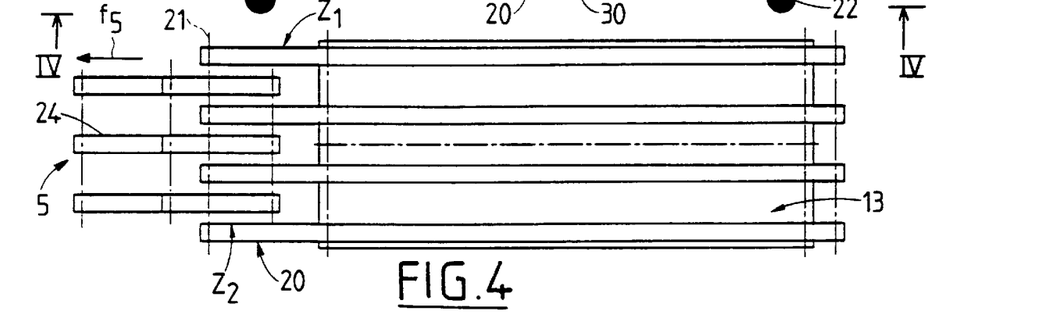
FIG. 4 is a plan view on line IV—IV of FIG. 3.
Figure 5:
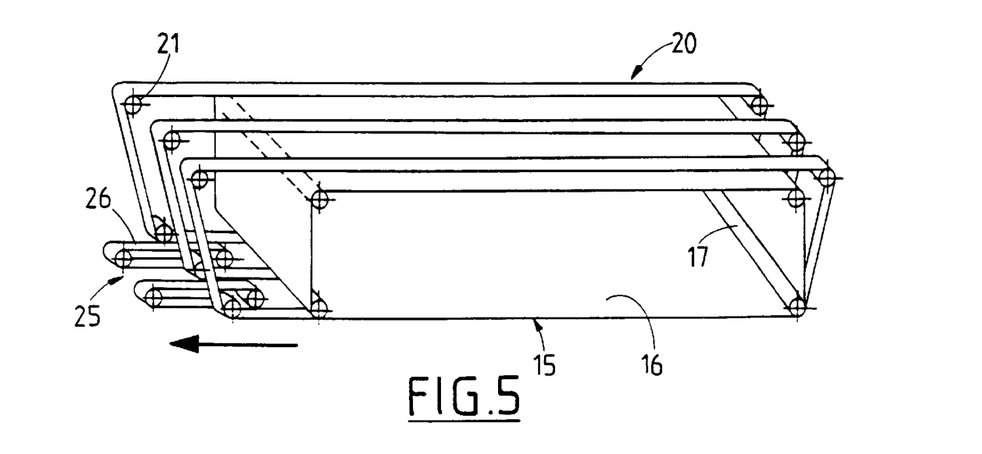
FIG. 5 is a perspective view corresponding to FIG. 3.

To avoid each blank adhering or sticking to one or other of the endless belts 13 and 15, and more particularly with the go lengths 14 and 16 thereof, the invention recommends implementing the transfer and extraction apparatus shown in a first embodiment with reference to FIGS. 3 to 5.

FIG. 3 shows the station 4 diagrammatically, and there can be seen the belt 13, the belt 15, and the superposed plates 10 and 11 of each assembly 4a and 4b.

In accordance with the invention, the transfer and extraction apparatus comprises, at least in association with the endless conveyor belt 13, an interposed layer 19 of the endless type, of small thickness, and disposed pressed against the face of the belt 13 that faces the belt 15. In the example shown, the layer 19 is constituted by a plurality of narrow guides 20 extending parallel to one another and under a certain amount of tension so as to be in alignment with the travel direction of the belt 13 as represented by arrow $f_3$ (FIGS. 2 and 3) which relates to the go length 14 thereof. In the embodiment shown, the guides 20 are constituted by endless strips passing over rollers 21 associated with cleaning members 22 which may, where appropriate, be coupled with tensioning members or which may be independent, with such members being shown under the reference 23 in FIG. 3.

The strips constituting the guides are at least flexible in nature and they are constituted either by thin metal sheet or, preferably, by optionally woven materials such as glass fibers coated or covered in a substance that is not adhesive or that is poorly adhesive, e.g. polytetrafluoroethylene.

In one disposition of the invention, each strip extends well beyond the zone $Z_1$ where the go length 14 changes direction, so as to meet the takeup transporter 5 which, according to the invention, is also advantageously constituted by a plurality of endless strips 24 extending parallel at constant spacing.

With this disposition, the strips 20 and the strips 24 of the transporter 5 are interleaved so as to share a common zone $Z_2$. The top lengths of the strips 24 lying in a common plane are driven to travel in the direction of arrow $f_5$.

In another disposition of the invention, the strips 20 are disposed so that their top lengths in contact with the go length 14 of the transporter 13 are driven simultaneously to travel in the direction of arrow $f_3$ at a linear speed which is preferably, but not exclusively, synchronous with that of the top length 14 of the transporter 13.

FIG. 3 shows that the same disposition is preferably also used for the transporter belt 15. The guides 20 associated with such a belt 15 are organized in the same manner as that described above, but symmetrically about a plane P–P' passing along the horizontal passage defined by the facing go lengths 14 and 16.

As described above and implemented in the intended application, the means of the invention operate as follows.

A blank such as 1 inserted into the station 4a to be subjected to a first temperature rise stage by contact and by pressure is, once the desired temperature has been reached, naturally moved towards the station 4b by the simultaneous displacement action of the go lengths 14 and 16 of the transporter belts 13 and 15.

Within the station 4b, the blank is again subjected to further pressing and heating until it reaches a desired temperature threshold, after which the blank needs to be taken to the mold 3.

On leaving the station 4b, beyond the zone $Z_1$ where the go lengths 14 and 16 bend away, the blank is taken over solely by the guides 20 which, in the example shown, move at the same linear speed as the go lengths 14 and 16. The guides 20 continue the initial displacement, taking over the blank in spite of its sticky or adhesive character that results from the rise in temperature imparted to the various composite materials making it up.

The blank is then supported by the strips 20 which have a contact area that is smaller than that of the lengths 14 or 16 and which are suitable not only for extracting it completely from the station 4b, but also for conveying it and handing it over to the takeup transporter 5 that acts as before, but via its interleaved strips 24.

In all cases, the means of the transfer and extraction apparatus of the invention are selected so as to reduce their area of contact with the large faces of the blank, thereby reducing the coefficient of adhesion so as to facilitate transfer from the strips 20 to the strips 24.

It-should be observed that the strips 20 are made of a material that is thin so that the presence of these strips on the facing surfaces of the go lengths 14 and 16 does not have the effect of preshaping grooves in the large faces of the blank during the pressing and heating action that takes place in each of the stations 4a and 4b in succession. In this respect, it is possible to form recesses in the top and bottom plates so that they have longitudinally extending grooves in which the guides and the belts can be received during pressing.

By comparing FIGS. 4 and 5, it can be seen that in another disposition of the invention, when the transfer apparatus is fitted to a station 4 that has two superposed endless transporter belts 13 and 15, it is advantageous to provide a number of guides or strips 20 for the top belt 15 that is different from the number of strips associated with the belt 13. In general, the difference is minus one, so as to make it possible to place strips 20 of the belt 15 so that they are offset in a vertical plane by half a pitch relative to the strips 20 of the belt 13. In this manner, the linear stress imparted to the large faces of each blank or plate is not superposed from one face to the other by the action of the presser plates 11 and 10 of the stations 4a and 4b.

Under such circumstances, it is also advantageous for the strips 20 of the transporter belt 15 to be associated with an accompanying transporter 25 constituted by strips 26 which are interleaved between the strips 20 in a manner that is analogous to that performed between the strips 24 of the takeup transporter 5 and the strips 20 of the transporter 13. The strips 26 are preferably disposed so that their bottom lengths slope upwards towards the press 2, thereby co-operating with the plane of the top lengths of the strips 24 to define a passage of progressively increasing section.

In a variant embodiment (not shown), the strips 20 could be relatively fixed or they could be subjected to intermittent displacement, optionally synchronously with the displacement of the transporter belts 13 and 15.

Figure 6:
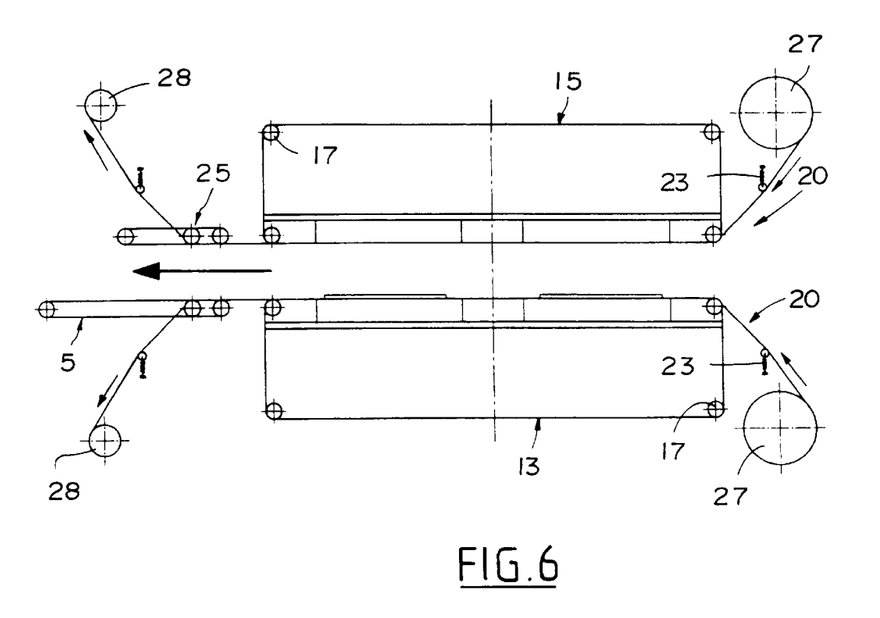
FIG. 6 is a side elevation comparable to FIG. 3, but showing a variant embodiment of the invention.

FIG. 6 shows another variant embodiment in which each guide or strip 20, whether of the belt 13 or of the belt 15, where appropriate, is not looped, i.e. each is paid out from a payout reel 27 and is taken up by a takeup reel 28.

This makes it possible to possible to envisage making the strips out of a material that is discardable and to implement travel means that operate intermittently so as to displace each strip sufficiently so that as it is used, any damage to its component material, in particular by transfer of sticky substances, gives rise to replacement by new strip that is in a better condition for performing the transfer and extraction function.

The guides may also be constituted in the form of rigid rods that are preferably flat in right cross-section.

When the strips 20 are in the form of endless loops, it is advantageous for each of them, and in particular for their return lengths, to be associated with a cooling device 30 as shown in FIG. 3.

In a variant embodiment, the layer 19 could be a thin open-mesh net such as a flexible endless grid in the form of a strip passing over the rollers 21, in which case the strips could be of a width that is smaller than or equal to that of the belts 13 and 15.

The invention is not limited to the examples described and shown since numerous modifications can be made thereto without going beyond its ambit.

I claim:

1. Apparatus for transferring and extracting a blank of sticky material relative to a workstation, said apparatus comprising:

at least a first continuously or intermittently driven endless transporter or conveyor belt with a first go length passing through said workstation and having a first surface which faces said blank of sticky material and defines a first surface area, said first conveyor belt being driven in a desired travel direction and bending away from said first surface of said first go length in a zone after said first go length; and a first thin layer with an area smaller than said first surface area of said first go length, said first thin layer being disposed under tension stress in contact with said first surface of said first go length so as to be in between said first go length and said blank of sticky material and reduce contact area between said first go length and said blank of sticky material, said first thin layer extending in said travel direction of said first conveyor belt downstream beyond said zone after said first go length in which said first conveyor belt bends.

2. Apparatus according to claim 1, further comprising:
    a take-up transporter or conveyor; and
    wherein said first thin layer extends in said travel direction as far as a zone where said first thin layer cooperates with said take-up transporter.

3. Apparatus according to claim 1, further comprising:
    a second continuously or intermittently driven endless transporter or conveyor belt with a second go length passing through said workstation and having a second surface which faces said blank of sticky material and defines a second surface area, said second conveyor belt being driven in said desired travel direction and bending away from said second surface of said second go length in a zone after said second go length, said second conveyor being disposed such that said surfaces of said go lengths face each other; and
    a second thin layer with an area smaller than said second surface area of said second go length, said second thin layer being disposed under tension stress in contact with said second surface of said second go length so as to be in between said second go length and said blank of sticky material and reduce contact area between said second go length and said blank of sticky material, said second thin layer extending in said travel direction downstream beyond said zone after said second go length in which said second conveyor belt bends.

4. Apparatus according to claim 3, further comprising:
    a take-up transporter or conveyor; and
    an accompanying transporter or conveyor;
    wherein said first thin layer extends in said travel direction as far as a zone where said first thin layer cooperates with said take-up transporter and said second thin layer extends in said travel direction as far as a zone where said second thin layer cooperates with said accompanying transporter.

5. Apparatus according to claim 1, wherein said first thin layer comprises an open mesh net.

6. Apparatus according to claim 3, wherein each of said thin layers comprises an open mesh net.

7. Apparatus according to claim 3, wherein said first thin layer comprises a plurality of guides disposed parallel to one another.

8. Apparatus according to claim 3, wherein each of said thin layers comprises a plurality of guides disposed parallel to one another.

9. Apparatus according to claim 7, wherein said guides are stationary relative to said first go length of said first conveyor belt.

10. Apparatus according to claim 8, wherein said guides are stationary relative to said go lengths of said conveyor belts.

11. Apparatus according to claim 7, wherein said guides comprise endless strips which are associated with cleaning members and with cooling devices.

12. Apparatus according to claim 8, wherein said guides comprise endless strips which are associated with cleaning members and with cooling devices.

13. Apparatus according to claim 7, wherein said guides comprise strips which are at least flexible.

14. Apparatus according to claim 8, wherein said guides comprise strips which are at least flexible.

15. Apparatus according to claim 13, wherein said strips are made of glass fiber cloth coated in polytetrafluoroethylene.

16. Apparatus according to claim 14, wherein said strips are made of glass fiber cloth coated in polytetrafluoroethylene.

17. Apparatus according to claim 13, wherein each of said strips is delivered from a payout or feeding reel and each is taken up by a take-up reel.

18. Apparatus according to claim 14, wherein each of said strips is delivered from a payout or feeding reel and each is taken up by a take-up reel.

19. Apparatus according to claim 2, wherein said take-up transporter comprises endless strips and wherein said guides are in an interleaved configuration with said endless strips in said zone where said first thin layer cooperates with said take-up transporter.

20. Apparatus according to claim 4, wherein said take-up transporter and said accompanying transporter each comprise endless strips and wherein said guides are respectively in an interleaved configuration with said endless strips in said zone where said first thin layer cooperates with said take-up transporter and in said zone where said second thin layer cooperates with said accompanying transporter.

21. Apparatus for transferring and extracting a blank of sticky material relative to a workstation, said apparatus comprising:

at least a first continuously or intermittently driven endless transporter or conveyor belt with a first go length passing through said workstation and having a first surface which faces said blank of sticky material and defines a first surface area, said first conveyor belt being driven in a desired travel direction and bending away from said first surface of said first go length in a zone after said first go length;

a first thin layer, associated with said first conveyor belt, with an area smaller than said first surface area of said first go length, said first thin layer being constituted by a first plurality of guides disposed parallel to one another under tension stress in contact with said first surface of said first go length so as to be in between said first go length and said blank of sticky material and reduce contact area between said first go length and said blank of sticky material, said first thin layer extending in said travel direction of said first conveyor belt downstream beyond said zone after said first go length in which said first conveyor belt bends;

a second continuously or intermittently driven endless transporter or conveyor belt with a second go length passing through said workstation and having a second surface which faces said blank of sticky material and defines a second surface area, said second conveyor belt being driven in said desired travel direction and bending away from said second surface of said second go length in a zone after said second go length, said second conveyor being disposed such that said surfaces of said go lengths face each other; and a second thin layer, associated with said second conveyor belt, with an area smaller than said second surface area of said second go length, said second thin layer being constituted by a second plurality of guides disposed parallel to one another under tension stress in contact with said second surface of said second go length so as to be in between said second go length and said blank of sticky material and reduce contact area between said second go length and said blank of sticky material, said second thin layer extending in said travel direction downstream beyond said zone after said second go length in which said second conveyor belt bends;

wherein said guides associated with said second conveyor belt are offset by half a spacing pitch relative to said guides associated with said first conveyor belt.

22. Apparatus according to claim 21, further comprising:
a take-up transporter or conveyor; and
an accompanying transporter or conveyor;
wherein said guides associated with said first conveyor belt extend in said travel direction as far as a zone where said guides associated with said first conveyor belt cooperate with said take-up transporter and said guides associated with said second conveyor belt extend in said travel direction as far as a zone where said guides associated with said second conveyor belt cooperate with said accompanying transporter.

23. Apparatus according to claim 21, wherein said guides are stationary relative to said go lengths of said conveyor belts.

24. Apparatus according to claim 21, wherein said guides comprise strips which are at least flexible.

25. Apparatus according to claim 24, wherein said strips are made of glass fiber cloth coated in polytetrafluoroethylene.

26. Apparatus according to claim 24, wherein said strips comprise endless loops and are associated with cleaning members and cooling devices.

27. Apparatus according to claim 24, wherein each of said strips is delivered from a payout or feeding reel and each is taken up by a take-up reel.

28. Apparatus according to claim 21, wherein said take-up transporter and said accompanying transporter each comprise endless strips and wherein said guides are respectively in an interleaved configuration with said endless strips in said zone where said guides associated with said first conveyor belt cooperate with said take-up transporter and in said zone where said guides associated with said second conveyor belt cooperate with said accompanying transporter.

29. A press for transforming thermoplastic-based composite material in plate form including the apparatus according to claim 1, further comprising:
a material feed station;
a station for heating said material in plate form by at least one assembly for pressing and heating them by contact;
a station for shaping and/or equipping said material in plate form;
a station for transfer of said material in plate form between said heating station and said shaping station; and
a take-up station following said shaping station;
wherein said transfer and extraction apparatus is provided in said heating station.

30. A press for transforming thermoplastic-based composite material in plate form including the apparatus according to claim 3, further comprising:
a material feed station;
a station for heating said material in plate form by at least one assembly for pressing and heating them by contact;
a station for shaping and/or equipping said material in plate form;
a station for transfer of said material in plate form between said heating station and said shaping station; and
a take-up station following said shaping station;
wherein said transfer and extraction apparatus is provided in said heating station.

31. A press for transforming thermoplastic-based composite material in plate form including the apparatus according to claim 21, further comprising:
a material feed station;
a station for heating said material in plate form by at least one assembly for pressing and heating them by contact;
a station for shaping and/or equipping said material in plate form;
a station for transfer of said material in plate form between said heating station and said shaping station; and
a take-up station following said shaping station;
wherein said transfer and extraction apparatus is provided in said heating station.

32. A press for transforming thermoplastic-based composite material in plate form including the apparatus according to claim 22, further comprising:
a material feed station;
a station for heating said material in plate form by at least one assembly for pressing and heating them by contact;
a station for shaping and/or equipping said material in plate form;
a station for transfer of said material in plate form between said heating station and said shaping station; and a take-up station following said shaping station;

wherein said transfer and extraction apparatus is provided in said heating station.

33. A press for transforming thermoplastic-based composite material in plate form including the apparatus according to claim 23, further comprising:

a material feed station;

a station for heating said material in plate form by at least one assembly for pressing and heating them by contact;

a station for shaping and/or equipping said material in plate form;

a station for transfer of said material in plate form between said heating station and said shaping station; and a take-up station following said shaping station;

wherein said transfer and extraction apparatus is provided in said heating station.

34. A press for transforming thermoplastic-based composite material in plate form including the apparatus according to claim 24, further comprising:

a material feed station;

a station for heating said material in plate form by at least one assembly for pressing and heating them by contact;

a station for shaping and/or equipping said material in plate form;

a station for transfer of said material in plate form between said heating station and said shaping station; and a take-up station following said shaping station;

wherein said transfer and extraction apparatus is provided in said heating station.

35. A press for transforming thermoplastic-based composite material in plate form including the apparatus according to claim 25, further comprising:

a material feed station;

a station for heating said material in plate form by at least one assembly for pressing and heating them by contact;

a station for shaping and/or equipping said material in plate form;

a station for transfer of said material in plate form between said heating station and said shaping station; and a take-up station following said shaping station;

wherein said transfer and extraction apparatus is provided in said heating station.

36. A press for transforming thermoplastic-based composite material in plate form including the apparatus according to claim 26, further comprising:

a material feed station;

a station for heating said material in plate form by at least one assembly for pressing and heating them by contact;

a station for shaping and/or equipping said material in plate form;

a station for transfer of said material in plate form between said heating station and said shaping station; and a take-up station following said shaping station;

wherein said transfer and extraction apparatus is provided in said heating station.

37. A press for transforming thermoplastic-based composite material in plate form including the apparatus according to claim 27, further comprising:

a material feed station;

a station for heating said material in plate form by at least one assembly for pressing and heating them by contact;

a station for shaping and/or equipping said material in plate form;

a station for transfer of said material in plate form between said heating station and said shaping station; and a take-up station following said shaping station;

wherein said transfer and extraction apparatus is provided in said heating station.

38. A press for transforming thermoplastic-based composite material in plate form including the apparatus according to claim 28, further comprising:

a material feed station;

a station for heating said material in plate form by at least one assembly for pressing and heating them by contact;

a station for shaping and/or equipping said material in plate form;

a station for transfer of said material in plate form between said heating station and said shaping station; and a take-up station following said shaping station;

wherein said transfer and extraction apparatus is provided in said heating station.

* * * * *